(12) United States Patent
Lin et al.

(10) Patent No.: US 11,530,707 B2
(45) Date of Patent: Dec. 20, 2022

(54) FAN

(71) Applicant: Acer Incorporated, New Taipei (TW)

(72) Inventors: Kuang-Hua Lin, New Taipei (TW); Cheng-Wen Hsieh, New Taipei (TW); Wen-Neng Liao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/228,665

(22) Filed: Apr. 12, 2021

(65) Prior Publication Data

US 2021/0324873 A1 Oct. 21, 2021

(30) Foreign Application Priority Data

Apr. 15, 2020 (TW) .................. 109112663

(51) Int. Cl.
| | |
|---|---|
| *F04D 29/28* | (2006.01) |
| *F04D 29/38* | (2006.01) |
| *B29C 45/00* | (2006.01) |
| *F04D 29/32* | (2006.01) |
| *F04D 29/30* | (2006.01) |
| *B29L 31/08* | (2006.01) |

(52) U.S. Cl.
CPC ........ *F04D 29/384* (2013.01); *B29C 45/0003* (2013.01); *F04D 29/281* (2013.01); *F04D 29/30* (2013.01); *F04D 29/325* (2013.01); *B29L 2031/08* (2013.01); *F05D 2240/307* (2013.01)

(58) Field of Classification Search
CPC ...... F04D 29/281; F04D 29/30; F04D 29/325; F04D 29/384; F05D 2240/307
See application file for complete search history.

(56) References Cited

U.S. PATENT DOCUMENTS

| | | | | |
|---|---|---|---|---|
| 2,104,306 | A * | 1/1938 | McLeod ................. | B64C 11/16 416/228 |
| 5,312,228 | A * | 5/1994 | De Jong ................. | B63H 1/16 416/191 |
| 6,450,760 | B1 * | 9/2002 | Furukawa ............. | F04D 29/526 416/189 |
| 10,539,157 | B2 * | 1/2020 | Schilling ................... | F01P 5/02 |
| 10,718,355 | B2 * | 7/2020 | Lin ........................ | F04D 29/667 |
| 2007/0065279 | A1 * | 3/2007 | Lin ........................ | F04D 29/281 415/206 |
| 2020/0355083 | A1 * | 11/2020 | Yeh ........................ | F04D 29/30 |

FOREIGN PATENT DOCUMENTS

| | | | | |
|---|---|---|---|---|
| CN | 2542861 | | 4/2003 | |
| CN | 101849110 B | * | 11/2012 | ........... F04D 23/008 |
| CN | 205172994 | | 4/2016 | |
| CN | 103807210 | | 8/2016 | |
| TW | I612223 B | * | 1/2018 | ............. F04D 29/26 |

\* cited by examiner

*Primary Examiner* — Justin D Seabe
(74) *Attorney, Agent, or Firm* — JCIPRNET

(57) ABSTRACT

A fan including a hub and a plurality metal blades is provided. Each of the blades extends from the hub and is inclined relative to a radial direction of the hub. Each blade has a distal edge away from the hub, and has a pair of wingtips at the distal edge.

7 Claims, 4 Drawing Sheets

FAN

CROSS-REFERENCE TO RELATED APPLICATION

This application claims the priority benefit of Taiwan application serial no. 109112663, filed on Apr. 15, 2020. The entirety of the above-mentioned patent application is hereby incorporated by reference herein and made a part of this specification.

BACKGROUND

1. Technical Field

The disclosure relates to a fan.

2. Description of Related Art

In response to the thinning trend of consumer electronic products, electronic products such as computers and handheld devices are developing towards thinness and high efficiency, but thinness and high efficiency are often in conflict. When a high-efficiency component is running, a large amount of waste heat is generated inside the electronic product. Therefore, a heat dissipation module needs to be configured to dissipate heat and cool the component. However, due to the thinned size of electronic products, the heat dissipation efficiency of existing heat dissipation modules is difficult to meet the demand.

Taking the fan required by the heat dissipation module as an example, when rotating, the blades of the fan and the surrounding structure, such as the housing of the fan, will inevitably produce blade pass tones. In particular, the distal edges of the blades are often found with high air resistance, low airflow, and loud noise due to turbulence generated.

SUMMARY

The disclosure provides a fan having a plurality of metal blades and a pair of wingtips at a distal edge of each metal blade to reduce the turbulence generated at the distal edge when the fan is rotating, thereby increasing the airflow and reducing blade pass tones.

The fan of the disclosure includes a hub and a plurality of metal blades respectively extending from the hub and inclined relative to a radial direction of the hub.

Each metal blade has a distal edge away from the hub and a pair of wingtips located at the distal edge.

Based on the above, the fan is provided with the metal blades and the pair of wingtips located at the distal edge of each of the metal blades. Therefore, when the fan is rotating, the turbulence generated may be reduced by the structures of the wingtips, thereby increasing the airflow and reducing blade pass tones to improve fan efficiency.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
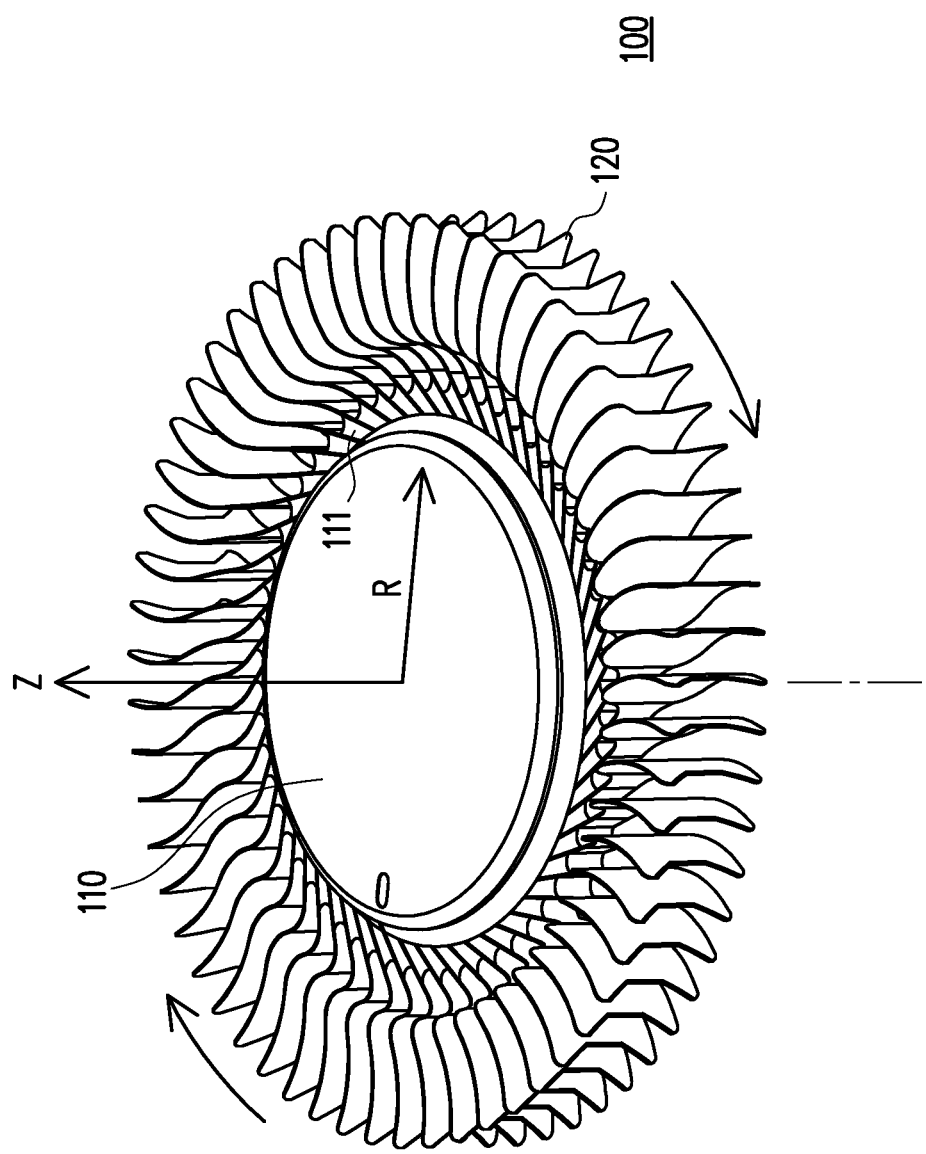
FIG. 1 is a schematic view of a fan according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 2:
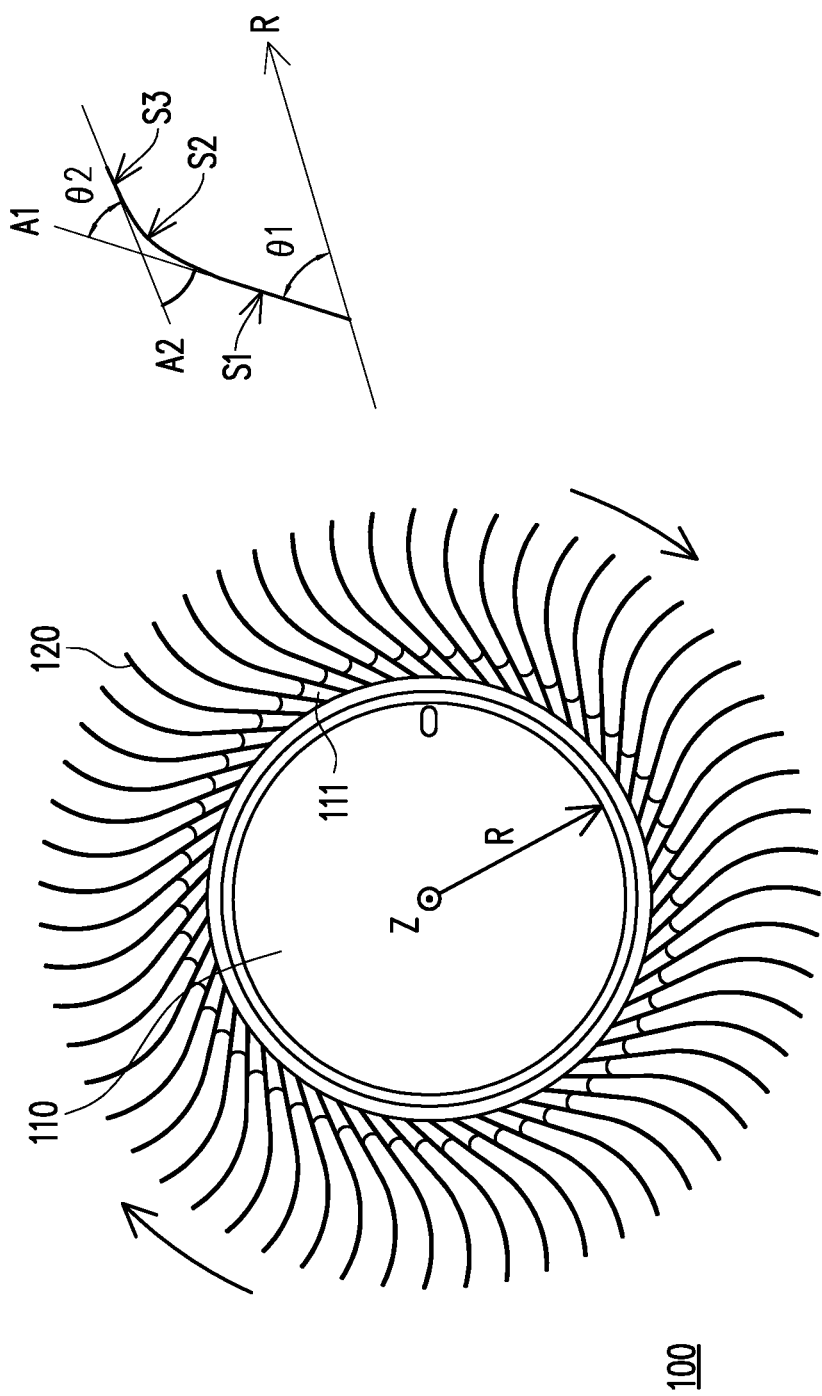
FIG. 2 is a top view of the fan in FIG. 1.

FIG. 1 is a schematic view of a fan according to an embodiment of the disclosure. FIG. 2 is a top view of the fan in FIG. 1, with one of the metal blades enlarged and shown on the right side. Referring to both FIG. 1 and FIG. 2, in the present embodiment, a cooling fan 100 is suitable to be configured in an electronic device (such as a laptop computer) to effectively dissipate heat from the heat source of the electronic device. Since the type of electronic device is not limited, the electronic device is omitted from the drawings shown herein. Here, the fan 100 includes a hub 110 and a plurality of metal blades 120, and an axial direction Z and a radial direction R of the hub 110 are provided in the drawings and the rotation direction of the fan 100 is indicated by arrows to facilitate the description of the relevant components.

Figure 3A:
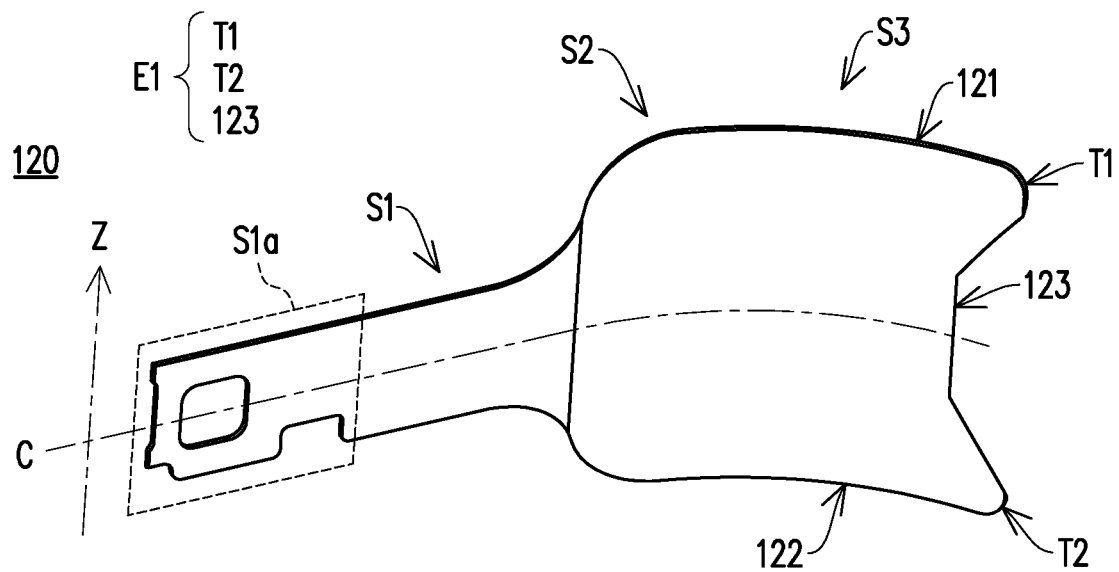
FIG. 3A and FIG. 3B illustrate a metal blade from different perspectives.
Figure 3B:
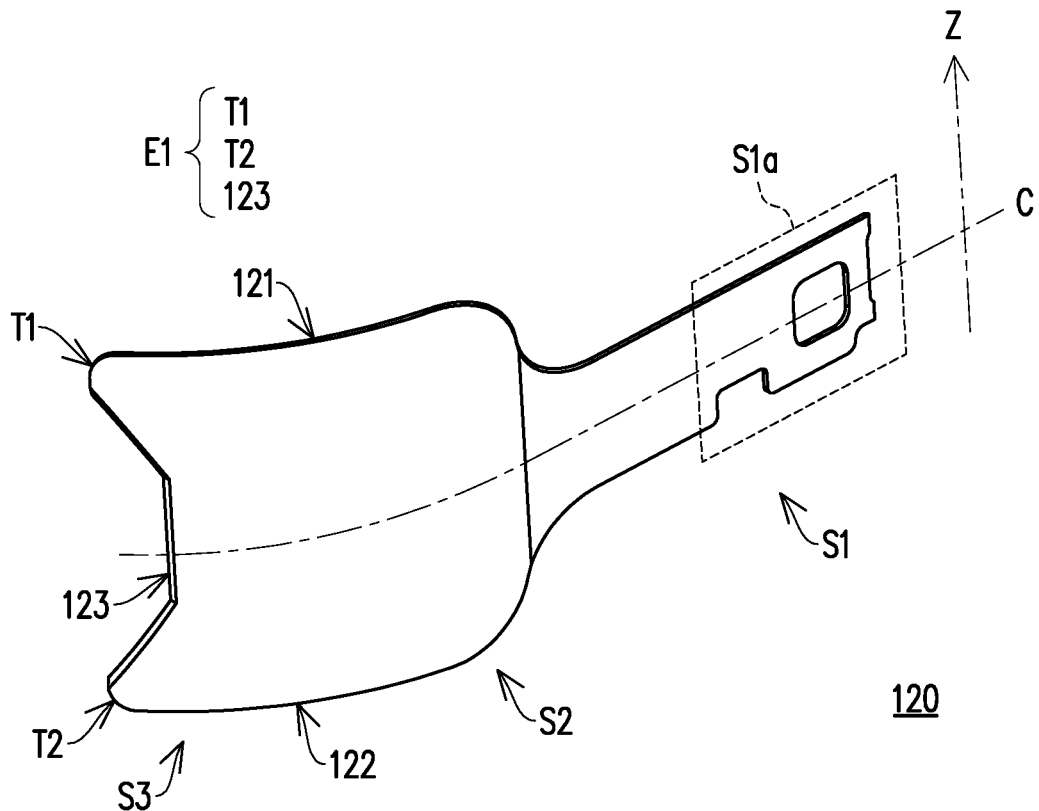

Each metal blade 120 of the present embodiment extends from the hub 110 and is inclined relative to the radial direction R of the hub 110. As shown in FIG. 2, the metal blade 120 has an acute angle θ1 with respect to the radial direction R; that is, the metal blade 120 is swept backward relative to the rotation direction (see arrows shown in FIG. 2) of the fan 100. FIG. 3A and FIG. 3B illustrate a metal blade from different perspectives. Referring to FIG. 2, FIG. 3A, and FIG. 3B, each metal blade 120 has a distal edge E1 away from the hub 110 and a pair of wingtips T1 and T2 located at the distal edge. In the present embodiment, the distal edge E1 of the metal blade 120 is substantially parallel to the axial direction Z of the hub 100, and the pair of wingtips T1 and T2 are respectively adjacent to an upper edge 121 and a lower edge 122 of the metal blade 120. Here, the pair of wingtips T1 and T2 are respectively raked wingtips; that is, the pair of wingtips T1 and T2 extend from the upper edge 121 or the lower 122 of the metal blade 120 and are obliquely reflexed to form a swept wing-like outline. Moreover, the metal blade 120 has a centerline C on a plane with the axial direction Z as a normal, and the wingtips T1 and T2 are substantially symmetrically configured relative to the centerline C. Further, each metal blade 120 further has a recess 123 located at the distal edge E1, and the recess 123 is adjacent to and between the pair of wingtips T1 and T2 so that the wingtips T1 and T2 face each other across the recess 123. Here, the recess 123 also has the centerline C as the center of symmetry.

Compared with the related art, the present embodiment uses the metal blade 120 and has better ductility and flexibility; more importantly, by forming the pair of wingtips T1 and T2 on the distal edge E1 of the metal blade 120, when the fan 100 is rotating, the turbulence at the distal edge E1 of the metal blade 120 can be reduced by the outline of the wingtips T1 and T2, thus improving the air resistance at the distal edge E1 i.e., increasing the airflow and reducing noise.

Referring further to FIG. 2, FIG. 3A, FIG. 3B, in the present embodiment, each metal blade 120 includes a plurality of segments having different curvatures along a path which the metal blade 120 extends away from the hub 110.

In addition, in each metal blade 120, the segments are formed by forming a plate-like workpiece of equal thickness by stamping and bending the plate-like workpiece. Each metal blade 120 is then bonded one by one with the hub 110 by injection molding or die casting. In other words, the present embodiment proposes, in view of the easy-to-form and easy-to-process characteristics of the metal blade 120 an easy-to-process method that corresponds to desired fan characteristics. In another embodiment, each metal blade 120 may be manufactured by one-time stamping.

In detail, referring to FIG. 3A and FIG. 3B, the metal blade 120 of the present embodiment is sequentially divided into a first segment S1, a second segment S2, and a third segment S3 along the path which the metal blade 120 extends from the hub 110, where the pair of wingtips T1 and T2 are located at the third segment S3, the first segment S1 forms an acute angle (the acute angle θ1) with respect to the radial direction R of the hub 110, and the second segment S2 and the third segment S3 are curved. In the present embodiment, the metal blade 120 further has a bonding structure S1a located at the first segment S1, such as the opening and recess shown in the drawings. The bonding structure S1a is an interfering structure that increases the bonding strength when a bonding component 111 of the hub 110 is bonded with the metal blade 120 by injection molding or die casting; that is, the bonding component 111 may increase the bonding area between components through the opening and the recess, so that the structures are interlaced and fit with each other.

Moreover, referring again to FIG. 2, although the first segment S1 is swept backward relative to the rotation direction of the fan 100, the subsequent outline is not; for example, the segment 2 of the present embodiment is an inflection segment of the first segment S1 and the third segment S3; that is, the outline of the metal blade 120 here is reflexed, and the direction of the reflexion is directly opposite to the rotation direction of the fan 100 (i.e. the reflex notch faces the arrows in the figure), therefore, when viewed from a top view, an asymptotic line A1 of the first segment S1 and an asymptotic line A2 of the third segment S3 form another acute angle θ2. Accordingly, with the outline feature, the metal blade 120 is capable of creating a "catching wind" effect when the fan 100 is rotating, thereby increasing the incoming and outgoing airflow.

Figure 4:
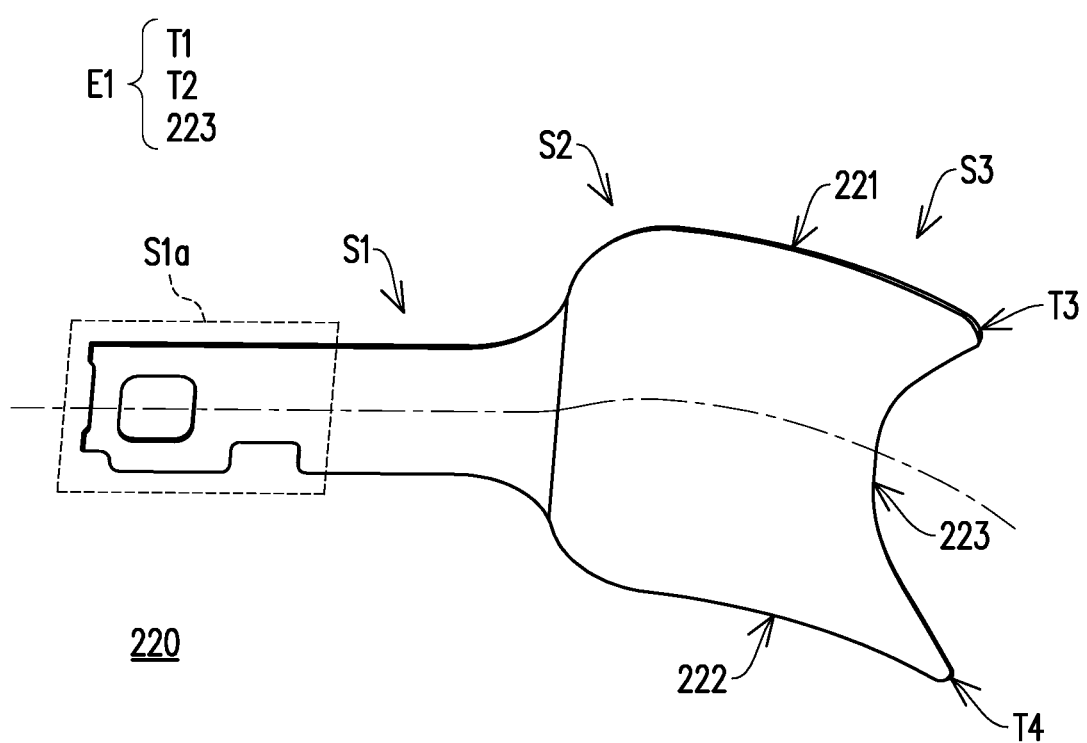
FIG. 4 is a schematic view of a metal blade according to another embodiment of the disclosure.

FIG. 4 is a schematic view of a metal blade according to another embodiment of the disclosure. Different from the previous embodiment, the metal blade 220 of this embodiment has a curved recess 223 at the distal edge E1 to allow a wingtip T3 to extend and reflex from an upper edge 221 and a wingtip T4 to extend and reflex from a lower edge 222 to intersect with each other in a smooth curve, thereby increasing the degree of turbulence suppression at the distal edge.

In summary, in the embodiments of the disclosure, the fan is provides with the metal blades, which, in addition to being easier to manufacture, also effectively reduces the size and weight of the fan to meet the thinning requirements of electronic products. At the same time, the rotation speed of the fan can be increased due to the lightweight metal blades, and the configuration margin is increased, which help the dynamic (rotation) balance of the fan.

More importantly, the fan is provided with the pair of wingtips located at the distal edge of each metal blade, which are raked wingtips symmetrically configured relative to the recess at the distal edge. At the same time, the outline of the metal blade along the path which the metal blade extends from the hub is first swept back then reflexed relative to the axial direction of the hub, thus the airflow can be increased by the outline of the metal blade and the turbulence generated can be reduced by the structural characteristics of the wingtips of the metal blade at the distal edge when the fan is rotating, which in turn reduces blade pass tones and increases fan efficiency.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A fan, comprising:
a hub; and
a plurality of metal blades respectively extending from the hub and inclined relative to a radial direction of the hub, each of the metal blades having a distal edge away from the hub and a pair of wingtips formed from the distal edge,
wherein the distal edge of the metal blade is parallel to an axial direction of the hub, the fan is rotated about the axial direction, and the pair of wingtips of the metal blade are respectively connected to an upper edge and a lower edge of the metal blade,
wherein the pair of wingtips are respectively raked wingtips to reduce the turbulence generated at the distal edge when the fan is rotating,
wherein each of the metal blades further has a recess located at the distal edge, and the recess is adjacent to and between the pair of wingtips so that the pair of wingtips face each other across the recess.

2. The fan according to claim 1, wherein the pair of wingtips are symmetrically configured relative to a centerline of the metal blade, the centerline located on a plane with the axial direction of the hub as a normal.

3. The fan according to claim 1, wherein the metal blade is sequentially divided into a first segment, a second segment, and a third segment along a path which the metal blade extends from the hub, and the wingtips are located in the third segment, the first segment forms an acute angle with respect to the radial direction of the hub, and the second segment and the third segment are curved.

4. The fan according to claim 3, wherein the second segment is an inflection segment of the first segment and the third segment, and an asymptotic line of the first segment and an asymptotic line of the third segment form another acute angle.

5. The fan according to claim 1, wherein each of the metal blades has a plurality of segments having different curvatures along a path which the metal blade extends away from the hub, and the segments of each of the metal blades are formed by forming a plate-like workpiece by stamping and then bending the plate-like workpiece.

6. The fan according to claim 5, wherein the metal blades are bonded with the hub by injection molding or die casting.

7. The fan according to claim 1, wherein each of the metal blades is manufactured by one-time stamping.

* * * * *